United States Patent
Wu et al.

(10) Patent No.: US 10,105,631 B2
(45) Date of Patent: Oct. 23, 2018

(54) AIR PURIFICATION METHOD AND APPARATUS

(71) Applicant: Xiaomi Inc., Beijing (CN)

(72) Inventors: Ke Wu, Beijing (CN); Xinyu Liu, Beijing (CN); Huayijun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 231 days.

(21) Appl. No.: 15/091,255

(22) Filed: Apr. 5, 2016

(65) Prior Publication Data

US 2016/0346721 A1    Dec. 1, 2016

(30) Foreign Application Priority Data

May 29, 2015 (CN) .......................... 2015 1 0290860

(51) Int. Cl.
| | |
|---|---|
| *B01D 53/02* | (2006.01) |
| *B01D 46/42* | (2006.01) |
| *B01D 46/44* | (2006.01) |
| *B01D 46/46* | (2006.01) |
| *G06K 9/00* | (2006.01) |
| *F24F 11/30* | (2018.01) |
| *F24F 3/16* | (2006.01) |
| *F24F 11/64* | (2018.01) |

(52) U.S. Cl.
CPC ......... *B01D 46/429* (2013.01); *B01D 46/442* (2013.01); *B01D 46/46* (2013.01); *F24F 11/30* (2018.01); *G06K 9/00771* (2013.01); *F24F 3/1603* (2013.01); *F24F 11/64* (2018.01)

(58) Field of Classification Search
CPC .... B01D 46/429; B01D 46/442; B01D 46/46; F24F 11/0086; F24F 2011/0063; F24F 3/1603; G06K 9/00771
See application file for complete search history.

(56) References Cited

U.S. PATENT DOCUMENTS

| 8,670,594 B2 | 3/2014 | Lejeune et al. | |
|---|---|---|---|
| 2006/0278086 A1* | 12/2006 | Inagaki | B01D 46/0001 96/223 |
| 2009/0226042 A1* | 9/2009 | Lejeune | A01G 1/00 382/110 |

FOREIGN PATENT DOCUMENTS

| CN | 1805776 A | 7/2006 |
|---|---|---|
| CN | 1932475 A | 3/2007 |
| CN | 1948840 A | 4/2007 |

(Continued)

OTHER PUBLICATIONS

Extended European Search Report from European Patent Office for European Application No. 16171405.0, dated Oct. 20, 2016, 7 pgs.

(Continued)

*Primary Examiner* — Christopher P Jones
(74) *Attorney, Agent, or Firm* — Finnegan, Henderson, Farabow, Garrett & Dunner LLP

(57) ABSTRACT

An air purification method for use in an apparatus is provided. The air purification method includes: acquiring plant information associated with one or more plants located in a target detection region; determining, based on the plant information and predetermined reference plant information of an allergy-causing plant, that the target detection region contains the allergy-causing plant and the allergy-causing plant is in a blooming state; and in response to the determining, enabling an air purification function of an air purification device.

17 Claims, 8 Drawing Sheets

(56) References Cited

FOREIGN PATENT DOCUMENTS

| | | |
|---|---|---|
| CN | 101210723 A | 7/2008 |
| CN | 101384164 A | 3/2009 |
| CN | 101980249 A | 2/2011 |
| CN | 102172233 A | 9/2011 |
| CN | 103336517 A | 10/2013 |
| CN | 103440672 A | 12/2013 |
| CN | 104048387 A | 9/2014 |
| CN | 203874641 U | 10/2014 |
| CN | 104329780 A | 2/2015 |
| CN | 104456831 A | 3/2015 |
| CN | 104536473 A | 4/2015 |
| CN | 104941330 A | 9/2015 |
| JP | 11-166754 | 6/1999 |
| JP | 2000167326 A | 6/2000 |
| JP | 2005000813 A | 1/2005 |
| JP | 2009526536 A | 7/2009 |
| JP | 20100254001 A | 11/2010 |
| JP | 2012165709 A | 9/2012 |
| JP | 2013162800 A | 8/2013 |
| RU | 44797 U1 | 3/2005 |
| WO | WO 2014/207629 A1 | 12/2014 |

OTHER PUBLICATIONS

International Search Report for International Application No. PCT/CN2015/098697, dated Mar. 29, 2016, 4 pages.

\* cited by examiner

AIR PURIFICATION METHOD AND APPARATUS

CROSS-REFERENCE TO RELATED APPLICATION

This application is based upon and claims priority to Chinese Patent Application No. 201510290860.8, filed on May 29, 2015, the entire contents of which are incorporated herein by reference.

TECHNICAL FIELD

The present disclosure generally relates to the field of computer technologies, and more particularly, to an air purification method and apparatus.

BACKGROUND

With the development of electronic technologies, household appliances have become diversified and gain wide application. Air purifiers are commonly used to clear or remove pollutants in the air, e.g., PM2.5, dust, odor, formaldehyde pollution resulting from renovation, bacteria, pollen and the like.

When plants are cultivated indoor, pollen of the blooming plants may spread in the air and cause allergic symptoms to people. To remove the pollen of these plants from the air, a user may turn on the air purifier to purify the air.

SUMMARY

According to a first aspect of the present disclosure, there is provided an air purification method for use in an apparatus, comprising: acquiring plant information associated with one or more plants located in a target detection region; determining, based on the plant information and predetermined reference plant information of an allergy-causing plant, that the target detection region contains the allergy-causing plant and the allergy-causing plant is in a blooming state; and in response to the determining, enabling an air purification function of an air purification device.

According to a second aspect of the present disclosure, there is provided an air purification apparatus, comprising: a processor; and a memory for storing instructions executable by the processor. The processor is configured to: acquire plant information associated with one or more plants located in a target detection region; determine, based on the plant information and predetermined reference plant information of an allergy-causing plant, that the target detection region contains the allergy-causing plant and the allergy-causing plant is in a blooming state; and in response to the determining, enable an air purification function of an air purification device.

According to a third aspect of the present disclosure, there is provided a non-transitory computer-readable storage medium having stored therein instructions that, when executed by one or more processors of an apparatus, cause the apparatus to perform operations including: acquiring plant information associated with one or more plants located in a target detection region; determining, based on the plant information and predetermined reference plant information of an allergy-causing plant, that the target detection region contains the allergy-causing plant and the allergy-causing plant is in a blooming state; and in response to the determining, enabling an air purification function of an air purification device.

It is to be understood that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of apparatuses and methods consistent with aspects related to the present disclosure as recited in the appended claims.

Figure 1:
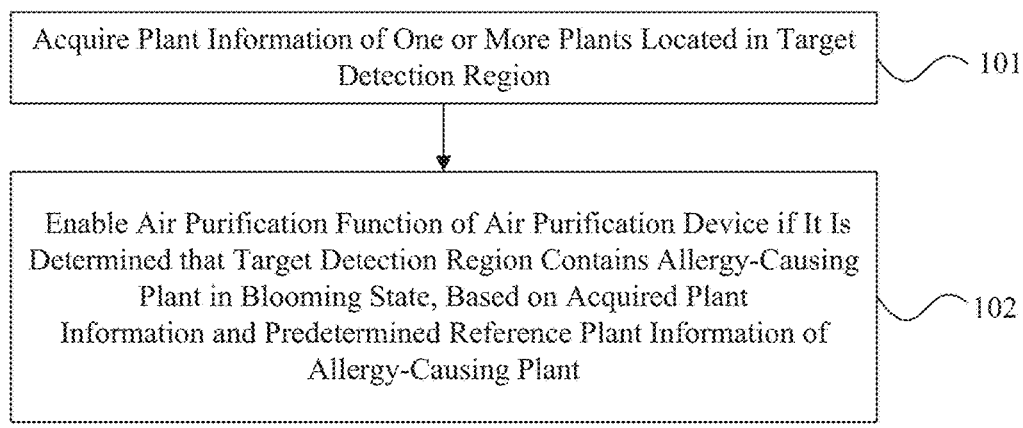
FIG. 1 is a flowchart of an air purification method, according to an example embodiment.

FIG. 1 is a flowchart of an air purification method 100, according to an example embodiment. The method 100 may be performed by an air purification device, or by a background server. Referring to FIG. 1, the method 100 includes the following steps.

In step 101, the air purification device (or the background server) acquires plant information of one or more plants located in a target detection region.

In some embodiments, the air purification device may include a purifier, a processor, and a memory. The purifier may be configured to purify the air, the processor may be configured to control operation of the purifier, and the memory may be configured to store data. The air purification device may further include input and output devices such as a screen, a keyboard, an image capturing component and the like. The screen may be configured to display information and may be a touch-controllable screen, the keyboard may be configured for a user to input information, and the image capturing component, such as a camera, may be used to acquire an image.

In some embodiments, the method 100 may also be performed by a background server associated with an air purification device. For example, the background server may control the air purification device and may store information, such as reference plant information, user information and the like. The background server may include a processor and a memory. The processor may be configured to perform information matching, device control, and the memory may be configured to store data.

In some embodiments, the target detection region may be a region where a plant cultivated by a user in his/her home is located. The plant information may be information used for determining plant cultivation or growth condition of the plants in the target detection region, such as an image of the target detection region, air composition information, or the like.

In some embodiments, the background server may send a request for acquiring plant information to the air purification device. Upon receiving the request, the air purification device may determine the target detection region, acquire plant information of the plant contained in this region, and send the plant information to the background server. In some embodiments, the background server may send the request for acquiring plant information to other devices (e.g., a smart camera or the like) associated with the air purification device, and the other devices may acquire the corresponding plant information and send the acquired information to the server. In other embodiments, the air purification device or the other devices, in a standby state, may automatically acquire the plant information of the plants in the target detection region periodically, and may send in real time the acquired plant information to the background server.

In some embodiments, the plant information may include an image of the target detection region. For example, the background server may send a request for acquiring image information to the air purification device. Upon receiving the request, the air purification device may enable the image capturing component to capture an image of the target detection region, and send the image to the background server. As another example, the background server may also send the request for acquiring image information to other devices (e.g., a smart camera or the like) associated with the air purification device, and the other devices may acquire the corresponding image and send the acquired image to the server. As another example, the air purification device or the other devices, in the standby state, may automatically acquire the image of the target detection region periodically, and may send in real time the acquired image to the background server.

The other devices may be any devices equipped with an image capturing component and having an image capture capability.

In some embodiments, the other devices may capture the image of the target detection region and transmit the image to the air purification device through various data transmission mechanisms, and thereafter the air purification device may send the image to the background server. In other embodiments, the other devices may send the image directly to the background server, where the background server may store a corresponding relationship between the air purification device and the other devices. After receiving the image, the background server may determine that the image is directed to a target detection region nearby the air purification device.

Figure 2:
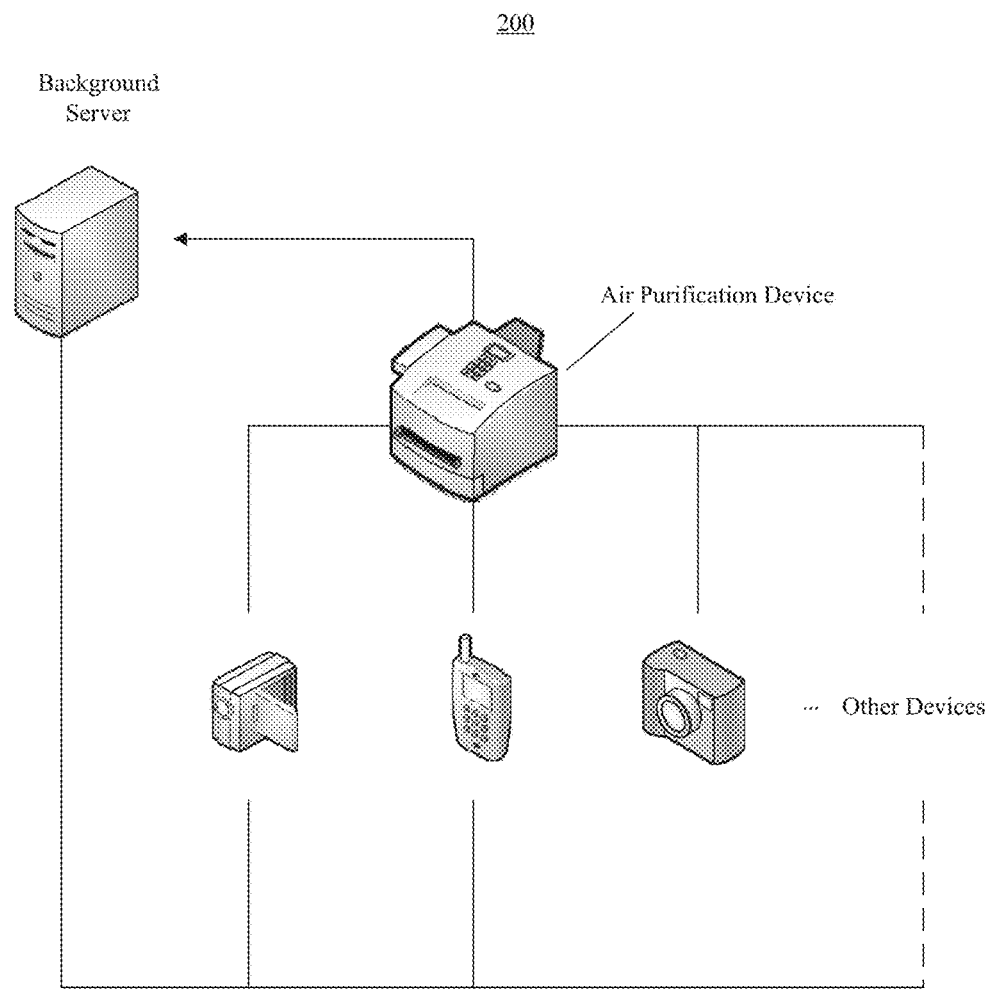
FIG. 2 is a schematic diagram illustrating an air purification system, according to an example embodiment.

FIG. 2 is a schematic diagram illustrating an air purification system 200, according to an example embodiment. In some embodiments, the background server may only acquire one image of the target detection region. In other embodiments, the background server may acquire multiple images of the target detection region via multiple devices (e.g., the air purification device and the other devices), and each of the images may be captured at different angles to improve the accuracy of image analysis.

In some embodiments, the plant information includes air composition information in the target detection region. The air composition information may include chemical property (e.g., chemical composition and the like) or physical property (e.g., particle diameter and the like) of substances contained in the air.

For example, the background server may send a request for acquiring air composition information to the air purification device. Upon receiving the request, the air purification device may enable an air detector to detect the air composition of this region, and send the air composition information to the background server. As another example, the air purification device, in the standby state, may automatically acquire the air composition information of the target detection region periodically, and send in real time the acquired air composition information to the background server.

Figure 3:
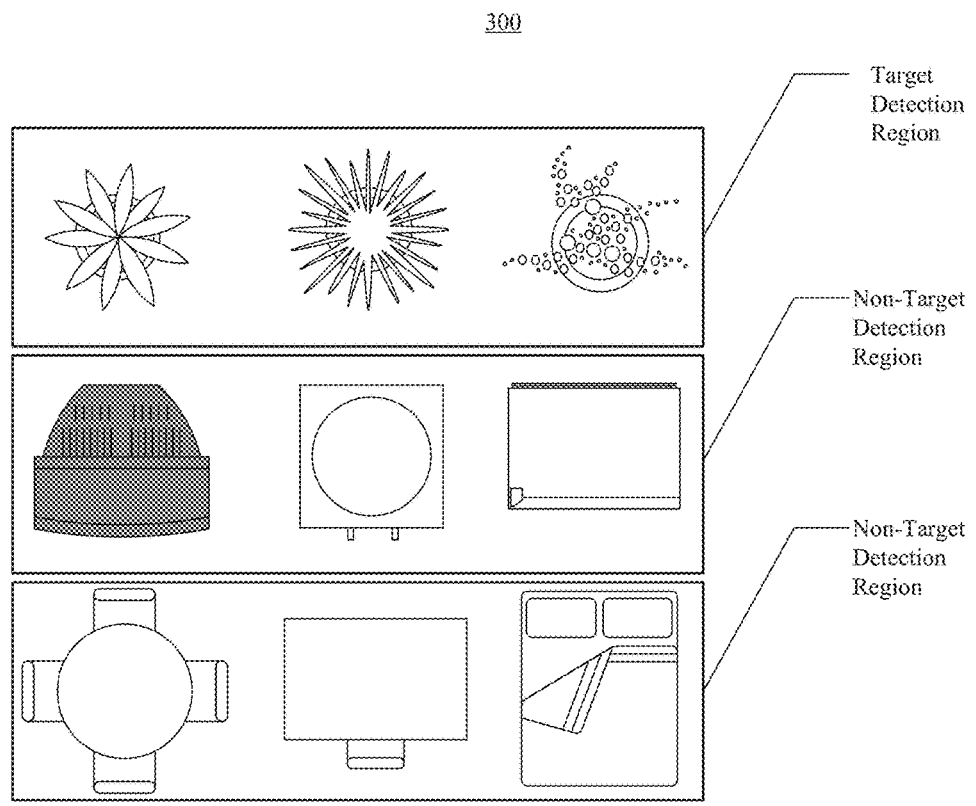
FIG. 3 is a schematic diagram illustrating an image captured during determination of a target detection region, according to an example embodiment.

In some embodiments, the target detection region may be set by a user, and the user may place the air purification device in the target detection region, such that the image capturing component of the air purification device faces towards the target detection region. In other embodiments, the background server may determine the target detection region prior to acquiring the plant information. For example, the background server may send a region determining request to the air purification device. Upon receiving the region determining request, the air purification device may enable the image capturing component to capture images in the photographable regions, and send the captured images to the background server. The background server may determine, according to contents of the images, a region containing the plant as a target detection region. FIG. 3 is a schematic diagram illustrating an image 300 captured during determination of a target detection region, according to an example embodiment. Afterwards, the background server may send a determination result to the air purification device, and the air purification device may determine a target detection region and cause the image capturing component to face towards the target detection region. The above described process of determining the target detection region may also be performed by the air purification device.

Referring back to FIG. 1, in step 102, the air purification device (or the background server) enables an air purification function of the air purification device if it is determined that the target detection region contains an allergy-causing plant in a blooming state, based on the acquired plant information and predetermined reference plant information of the allergy-causing plant.

The reference plant information may be used for determining whether a plant is contained in the target detection region and whether the plant is in a blooming state. For example, the reference plant information may include a reference plant image, a reference pollen composition, and the like.

In some embodiments, the background server may store reference plant information of various plants and corresponding identity information of the plants. The reference plant information may be acquired via input by a user or via a network. The background server may store personal account information of a user, and the personal account information of the user may include identity information of an allergy-causing plant causing an allergic condition to the user. The identity information of the allergy-causing plant may be input by the user in the air purification device, and be transmitted by the air purification device to the background server. In some embodiments, the identity information of the allergy-causing plant may be acquired from an electronic medical record of the user stored in the background server. Upon receiving the plant information of the plants contained in the target detection region sent by the air purification device or the other devices, the background server may determine an account associated with the air purification device or other devices, and acquire corresponding personal account information of a user. The background server may acquire identity information of the allergy-causing plant from the personal account information, acquire corresponding reference plant information stored locally based on the identity information of the allergy-causing plant, compare the reference plant information with the acquired plant information, and determine, according the comparison result, whether an allergy-causing plant in a blooming state is present in the target detection region. If it is determined that the target detection region contains an allergy-causing plant that is in the blooming state, the background server may send an air purification request to the air purification device to enable the air purification function. Upon receiving the air purification request, the air purification device may start running the air purification function to purify the air.

Figure 4:
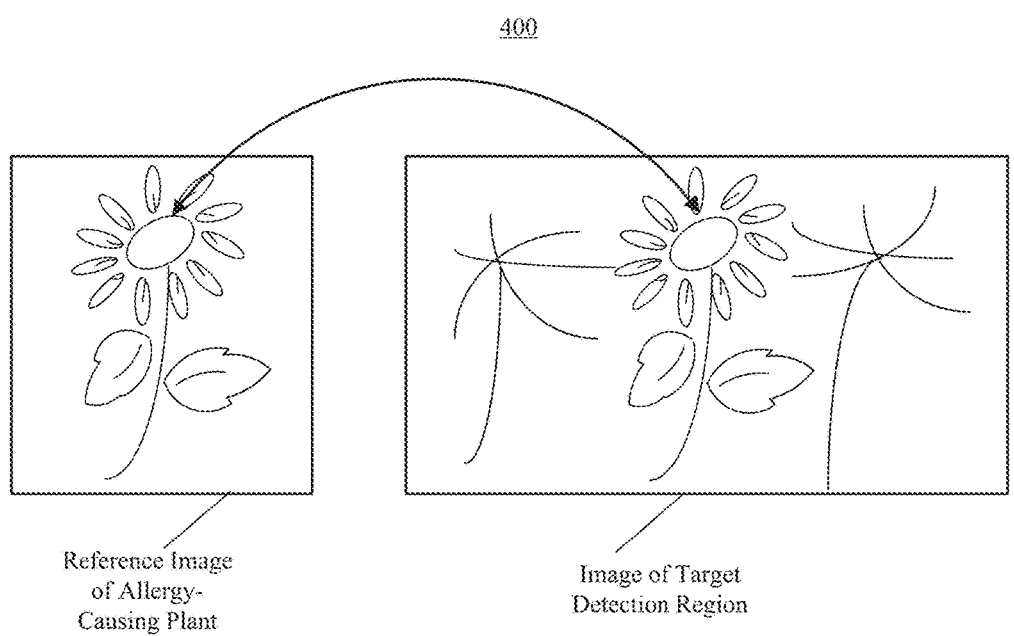
FIG. 4 is a schematic diagram illustrating an image processing method, according to an example embodiment.

In some embodiments, the background server may store images of various plants in a blooming state and identity information of these plants. Upon receiving the image of the target detection region sent by the air purification device or the other devices, the background server may determine an account associated with the air purification device or the other devices, and acquire corresponding personal account information. The background server may acquire identity information of the allergy-causing plant from the personal account information, and acquire a corresponding image of the allergy-causing plant in the blooming state stored locally based on the identity information of the allergy-causing plant. The background server may search for an image region resembling the image of the allergy-causing plant in the blooming state from the acquired image of the target detection region. For example, a matching-based search may be performed based on the appearance, profile, color of the image of the allergy-causing plant in the blooming state, or a combination thereof. FIG. 4 is a schematic diagram 400 illustrating an image processing method, according to an example embodiment. As illustrated in FIG. 4, when an image region in the acquired image information resembles the stored image of the allergy-causing plant in the blooming state, it may be determined that an allergy-causing plant in the blooming state is present in the target detection region, and the background server may send an air purification request to the air purification device to enable the air purification function of the air purification device. Upon receiving the air purification request, the air purification device may start running the air purification function to purify the air.

In some embodiments, the background server may store pollen composition information of various plants and identity information of these plants. The pollen composition information may include chemical property (e.g., chemical composition and the like) or physical property (e.g., particle diameter and the like) of the pollen. Upon receiving the air composition information of the target detection region sent by the air purification device, the background server may determine an account associated with the air purification device, and acquire corresponding personal account information. The background server may acquire identity information of the allergy-causing plant based on the personal account information, and acquire corresponding pollen composition information of the allergy-causing plant stored locally based on the identity of the allergy-causing plant. The background server may search for a composition matching the pollen composition information of the allergy-causing plant from the acquired air composition information of the target detection region. For example, the matching between the composition and the pollen composition information may be determined based on the chemical composition or the particle diameter. Afterwards, it may be determined, according to the search result, whether an allergy-causing plant in the blooming state is present in the target detection region. If it is determined that the target detection region contains an allergy-causing plant and the allergy-causing plant is in the blooming state, the background server may send an air purification request to the air purification device to enable the air purification function of the air purification device. Upon receiving the air purification request, the air purification device may enable the air purification function to purify the air.

In some embodiments, the background server may control the air purification device to provide an environmental temperature and an environmental humidity suitable for the growth of a plant. For example, the background server may identify a plant contained in a target detection region according to the image of the target detection region and pre-stored reference plant images of various plants, and cause an air purification device to adjust the environmental temperature and the environmental humidity according to prestored growth temperature and humidity information of the plant. The reference plant image may be an image of the plant stored in the background server, an image of the plant in the blooming state, or an image of the plant in any state such as a non-blooming state.

In some embodiments, the background server may store one or multiple images of each plant in different states. In addition, the background server may store growth temperature and humidity of various plants. The air purification device may be equipped with functions such as refrigeration, heating, humidification, dehumidification and the like.

Figure 5:
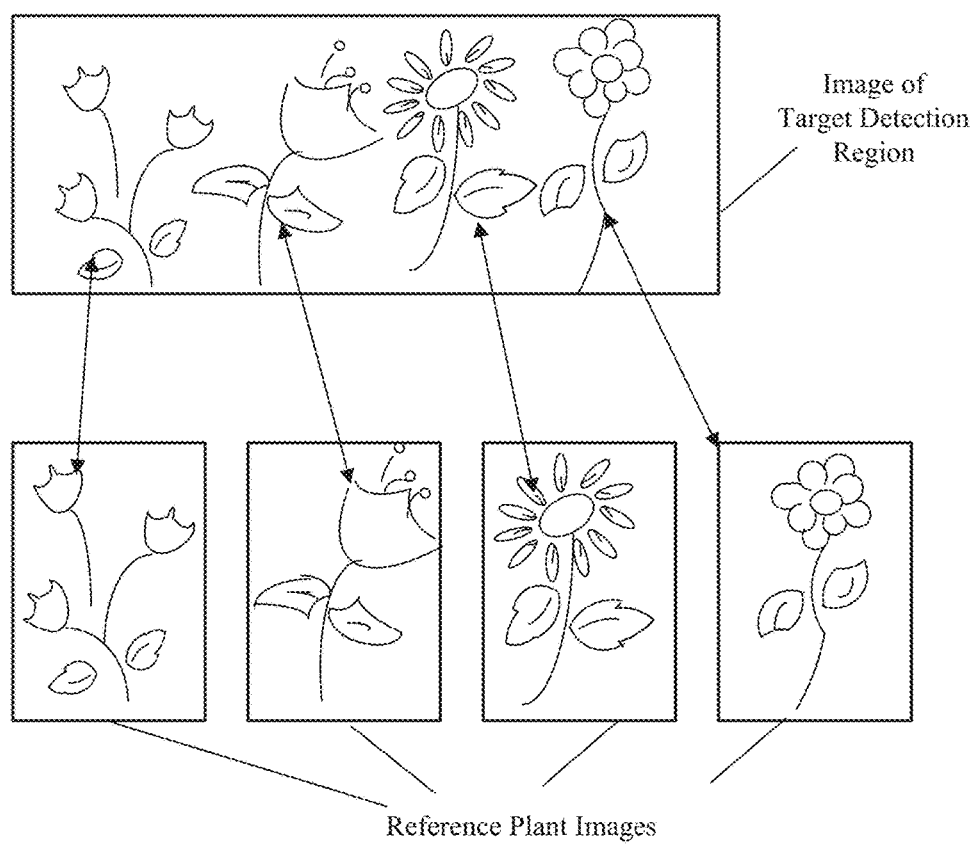
FIG. 5 is a schematic diagram illustrating another image processing method, according to an example embodiment.

Upon acquiring the image of the target detection region, the background server may perform region segmentation on the image for each plant according to a predetermined plant image determination rule. For example, the background server may perform region segmentation according to parts of the plant, such as stem, leaf, flower and the like of the plant, and determine image regions corresponding to each of the plants contained in the acquired image. The background server may match the image regions of the various plants with the pre-stored reference plant images of the various plants, and a comparison may be made according to the appearances, profiles, and color of the plants. FIG. 5 is a schematic diagram 500 illustrating an image processing method, according to an example embodiment. As illustrated in FIG. 5, when the appearances, profiles, and color of the plant in the image region and the pre-stored reference plant image satisfy a predetermined similarity level, it may be determined that the plant corresponding to the image region is the same as the plant in the reference plant image, and the identity information of the corresponding plant may be acquired.

In some embodiments, the background server may acquire the pre-stored growth temperature and humidity information of the plant according to the acquired identity of the plant, acquire the growth temperature and humidity information of the plants in the target detection region, and determine a suitable temperature range and humidity range for the target detection region. The background server may send the suitable temperature range and humidity range for the target detection region to the air purification device. The air purification device may adjust the environmental temperature and environmental humidity in the target detection region accordingly by adjusting functions such as refrigeration, heating, humidification, dehumidification and the like.

In the method 100, when the allergy-causing plant is blooming, the air purification device may detect the blooming of the allergy-causing plant and clear pollen in the air, thereby reducing the adverse effects caused by the pollen.

Figure 6:
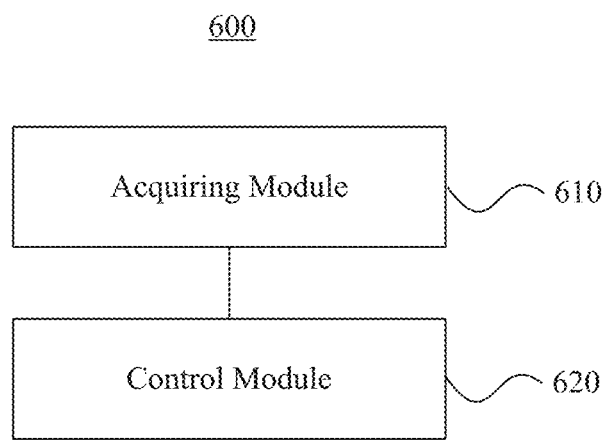
FIG. 6 is a block diagram of an air purification apparatus, according to an example embodiment.

FIG. 6 is a block diagram of an air purification apparatus 600, according to an example embodiment. Referring to FIG. 6, the apparatus 600 includes an acquiring module 610 and a control module 620.

The acquiring module 610 is configured to acquire plant information of one or more plants located in a target detection region.

The control module 620 is configured to to enable an air purification function of an air purification device if it is determined that the target detection region contains an allergy-causing plant and the allergy-causing plant is in a blooming state, according to the acquired plant information and predetermined reference plant information of the allergy-causing plant.

In some embodiments, the acquiring module 610 may be configured to acquire an image of the target detection region. The control module 620 may be configured to enable the air purification function of the target air purification device based on the image of the target detection region and a predetermined reference plant image of the allergy-causing plant, where the reference plant image includes an image of the allergy-causing plant in the blooming state.

In some embodiments, the acquiring module 610 may be configured to acquire the image of the target detection region from an image capturing component of the air purification device and/or another device.

Figure 7:
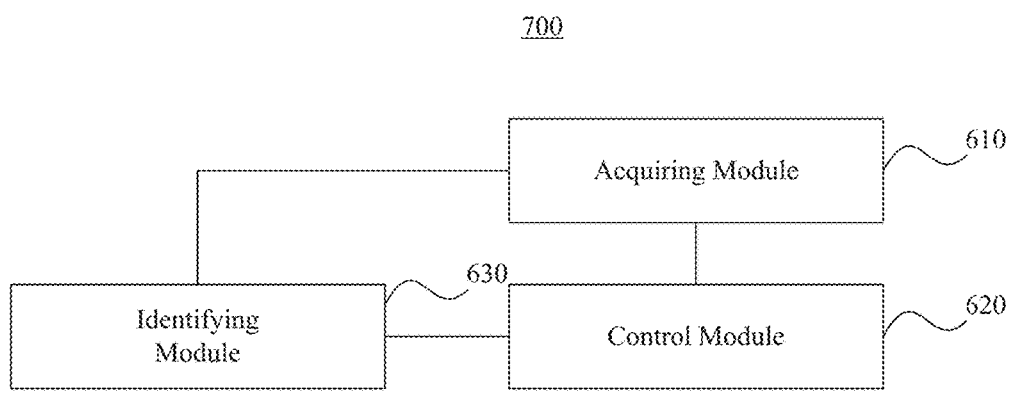
FIG. 7 is a block diagram of another air purification apparatus, according to an example embodiment.

FIG. 7 is a block diagram of another air purification apparatus 700, according to an example embodiment. Referring to FIG. 7, in addition to the acquiring module 610 and the control module 620 (FIG. 6), the apparatus 700 further includes an identifying module 630.

The identifying module 630 is configured to identify, according to the acquired image of the target detection region and pre-stored reference plant images of various plants, one or more plants located in the target detection region.

The control module 620 may be further configured to control the target air purification device to adjust an environmental temperature and an environmental humidity according to pre-stored growth temperature and humidity information corresponding to the one or more plants.

In some embodiments, the acquiring module 610 may be configured to acquire air composition information of the target detection region. The control module 620 may be configured to control the target air purification device to enable the air purification function if it is determined that the air in the target detection region contains pollen of an allergy-causing plant, according to the air composition information of the target detection region and predetermined pollen composition information of the allergy-causing plant.

Figure 8:
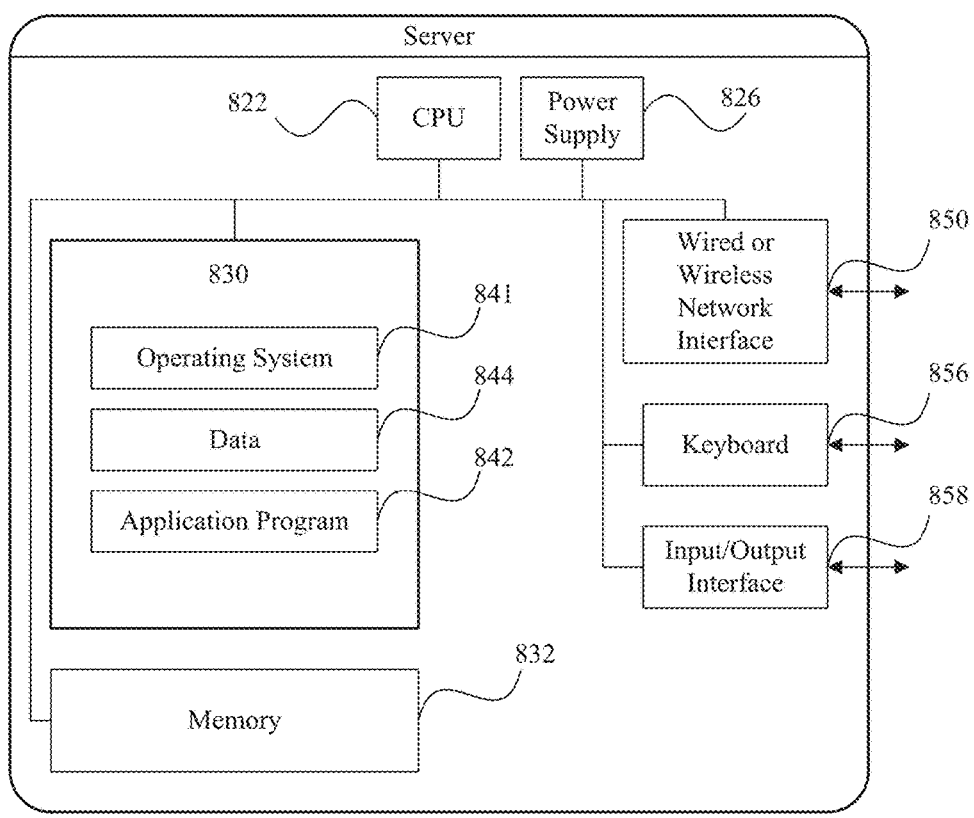
FIG. 8 is a block diagram of an apparatus for air purification, according to an example embodiment.

FIG. 8 is a block diagram illustrating an apparatus 800 for air purification, according to an example embodiment. For example, the apparatus 800 may be provided as a server, such as a background server discussed above. Referring to FIG. 8, the apparatus 800 includes a central processing unit (CPU) 822, which further includes one or more processors. The apparatus 800 further includes a memory 832, configured to store instructions, such as applications, executable by the CPU 822. The applications stored in the memory 832 may include one or more modules each corresponding to a group of instructions. The apparatus 800 may also include memory resources 830 storing an operating system 841, data 844, and one or more applications programs 842. In addition, the CPU 822 is configured to execute the instructions, to perform the above described methods.

The apparatus 800 may further include a power supply 826 configured to perform power management in the apparatus 800, a wired or wireless network interface 850 configured to connect the apparatus 800 to a network, a keyboard 856, and an input/output (I/O) interface 858. The apparatus 800 may operate based on an operating system stored in the memory 832, such as Windows Server™, Mac OS X™, Unix™, Linux™, FreeBSD™, or the like.

In exemplary embodiments, there is also provided a non-transitory computer-readable storage medium including instructions, such as included in the memory 832, executable by the CPU 822 in the apparatus 800, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. An air purification method for use in an apparatus, comprising:
   acquiring plant information associated with one or more plants located in a target detection region;
   determining, based on the plant information and predetermined reference plant information of an allergy-causing plant, that the target detection region contains the allergy-causing plant and the allergy-causing plant is in a blooming state, wherein the predetermined reference plant information comprises an image of the allergy-causing plant in the blooming state; and
   in response to the determining, enabling an air purification function of an air purification device.

2. The method according to claim 1, wherein the plant information comprises an image of the target detection region.

3. The method according to claim 2, wherein the image of the target detection region is captured by an image capturing component of the air purification device or another device.

4. The method according to claim 2, further comprising:
identifying, according to the image of the target detection region and pre-stored reference plant images of a plurality of plants, at least one plant in the target detection region; and
causing the air purification device to adjust an environmental temperature and an environmental humidity according to pre-stored growth temperature information and growth humidity information corresponding to the at least one plant.

5. The method according to claim 1, wherein the plant information comprises air composition information of the target detection region.

6. The method according to claim 5, wherein the predetermined reference plant information comprises predetermined pollen composition information of the allergy-causing plant.

7. The method according to claim 6, wherein determining that the target detection region contains the allergy-causing plant and the allergy-causing plant is in a blooming state comprises:
determining, according to the air composition information of the target detection region and the predetermined pollen composition information of the allergy-causing plant, that the air in the target detection region contains pollen of the allergy-causing plant.

8. The method according to claim 1, further comprising:
determining the target detection region and one or more non-target detection regions based on a plurality of images captured by the air purification device, wherein the one or more non-target detection regions contain no plant.

9. An air purification apparatus, comprising:
a processor; and
a memory for storing instructions executable by the processor;
wherein the processor is configured to:
acquire plant information associated with one or more plants located in a target detection region;
determine, based on the plant information and predetermined reference plant information of an allergy-causing plant, that the target detection region contains the allergy-causing plant and the allergy-causing plant is in a blooming state, wherein the predetermined reference plant information comprises an image of the allergy-causing plant in the blooming state; and
in response to the determining, enable an air purification function of an air purification device.

10. The apparatus according to claim 9, wherein the plant information comprises an image of the target detection region.

11. The apparatus according to claim 10, wherein the image of the target detection region is captured by an image capturing component of the target air purification device or another device.

12. The apparatus according to claim 10, wherein the processor is further configured to:
identify, according to the image of the target detection region and pre-stored reference plant images of a plurality of plants, at least one plant in the target detection region; and
cause the air purification device to adjust an environmental temperature and an environmental humidity according to pre-stored growth temperature information and growth humidity information corresponding to the at least one plant.

13. The apparatus according to claim 9, wherein the plant information comprises air composition information of the target detection region.

14. The apparatus according to claim 13, wherein the predetermined reference plant information comprises predetermined pollen composition information of the allergy-causing plant.

15. The apparatus according to claim 14, wherein the processor is further configured to:
determine, according to the air composition information of the target detection region and the predetermined pollen composition information of the allergy-causing plant, that the air in the target detection region contains pollen of the allergy-causing plant.

16. The apparatus according to claim 9, wherein the processor is further configured to determine the target detection region and one or more non-target detection regions based on a plurality of images captured by the air purification device, the one or more non-target detection regions containing no plant.

17. A non-transitory computer-readable storage medium having stored therein instructions that, when executed by one or more processors of an apparatus, cause the apparatus to perform operations including:
acquiring plant information associated with one or more plants located in a target detection region;
determining, based on the plant information and predetermined reference plant information of an allergy-causing plant, that the target detection region contains the allergy-causing plant and the allergy-causing plant is in a blooming state, wherein the predetermined reference plant information comprises an image of the allergy-causing plant in the blooming state; and
in response to the determining, enabling an air purification function of an air purification device.

* * * * *